United States Patent [19]

Caron

[11] 3,927,392

[45] Dec. 16, 1975

[54] CONDITIONAL SKEW COMPENSATION ARRANGEMENT

[75] Inventor: Lionel Caron, Holmdel, N.J.

[73] Assignee: Bell Telephone Laboratories, Incorporated, Murray Hill, N.J.

[22] Filed: June 17, 1974

[21] Appl. No.: 479,891

[52] U.S. Cl. ...................... 340/146.1 BE; 340/172.5

[51] Int. Cl. ............................................ H04m 3/22

[58] Field of Search ............ 340/146.1 F, 146.1 BE, 340/146.1 D, 172.5; 360/26, 36, 47

[56] References Cited

UNITED STATES PATENTS

| | | | |
|---|---|---|---|
| 3,633,162 | 1/1972 | Findelsen | 340/146.1 F |
| 3,761,903 | 9/1973 | Bird, Jr. et al. | 340/146.1 F |
| 3,803,552 | 4/1974 | Barlow et al. | 340/146.1 F |
| 3,843,952 | 10/1974 | Husson | 340/172.5 |

*Primary Examiner*—Charles E. Atkinson
*Attorney, Agent, or Firm*—D. E. Nester; J. W. Falk

[57] ABSTRACT

An arrangement is disclosed for conditionally compensating for skewing in the reception of data words transmitted over duplicated data transmission links. Each data word is serially transmitted over two links of different lengths having the same destination. A first counter is provided for counting each of the bits of the data word received over the first link, and a second counter is provided for counting each of the bits of the data word received over the second link. When one of the counters reaches a predetermined number indicating that the complete data word has been received, a determination is made if the present count in the other counter is within an allowable number of counts of the predetermined number. If this relationship exists, then the system waits for the other counter to reach the predetermined number, and then both complete data words are serially compared and the data word is executed. However, if the transmission of the data word over one link is too much slower than over the other link, then the first complete data word is immediately gated out and executed without waiting for the complete reception of the data word over the other link.

18 Claims, 9 Drawing Figures

CONDITIONAL SKEW COMPENSATION ARRANGEMENT

FIELD OF THE INVENTION

This invention pertains to communication transmission systems and, more particularly, to systems for compensating for skewing in the reception of data transmitted over data links having different time delay characteristics.

BACKGROUND OF THE INVENTION AND PRIOR ART

Electrical signals such as modulated sine waves propagate over data links at approximately the speed of light. Actually, this propagation is somewhat slower due to various delays caused by repeaters and carrier systems. Thus, data in the form of electrical signals takes a finite amount of time to propagate over a data link. Normally, the propagation delay is about 6 $\mu s$ per mile. Thus, electrical signals require about 1.2 ms to travel over a data link 200 miles long.

In various transmission arrangements where high reliability is essential, such as in telephone switching equipment, processing entities may communicate over duplicated transmission facilities, each of which may be of a different length. If one transmission facility is out-of-service, the two processing entities can still communicate at normal efficiency over the alternate transmission facility. The need for such duplicate facilities is critical in systems operating in real-time because a complete breakdown in communication will disrupt service and result in the loss of irreplaceable information.

In one prior arrangement in which duplicated data links were utilized, each data word was simultaneously transmitted over both data links. However, one link was always deemed "active" and the other deemed "standby." The actual data utilized to control the remote processor was always received over the active link so the fact that data was received over a shorter link prior to being received over the longer link was of no consequence. In the case of a malfunction in the active link, the alternate link was then deemed active and the roles of the links thereby reversed.

To minimize the possible physical disruption of duplicated data links, each data link can be routed over a geographically distinct route, rather than including both data links in the same cable. As a consequence of this intentional routing, one data link may be several hundred miles longer than the other link. Thus when a data word is simultaneously transmitted over both data links, it will be received at a remote location via the shorter link prior to its reception over the longer link.

It is an object of this invention to transmit each data word over duplicated transmission facilities having different propagation delays and whenever feasible to institute comparisons between each of the data words received over each facility to ensure the integrity of the received data.

It is a further object of this invention to conditionally compensate for skewing in the reception of data words transmitted over data links of different lengths.

It is a still further object of this invention to compensate for this skewing only within predetermined allowable limits based upon an expected propagation delay differential between two different length data links.

SUMMARY OF THE INVENTION

In accordance with this one illustrative embodiment of my invention, a first counter is provided for counting each of the bits of the data words received over one link and a second counter is provided for counting each of the bits of the data words received over the other link. When the count in one of the counters is equal to the number of bits of the word transmitted, indicating a complete word has been received, control logic ascertains whether the present count in the other counter is within an allowable number of counts. If this relationship exists, the "fast" link waits for the "slow" link to receive the complete word, then both words are compared for accuracy and executed.

However, if the present count in the other counter is not within this allowable limit indicating that the slower link has fallen too far behind the other link, then the completely received data word is immediately gated out of the faster link and no comparison is made.

The predetermined delay defined by the allowable number of counts the slow link can be behind the fast link is based upon the difference in length of the data links, the corresponding time differential for signals to traverse this length differential, and the frequency at which the bits are transmitted. It is anticipated that different count delays will be utilized in accordance with the expected difference in transit time of signals applied to the data links.

Logic circuitry is also provided for making a determination whether or not to wait for a slower link based upon the following additional criteria: 1) one link received the first bit of the next word before the other link received the last bit of the present word; and 2) although one link was the last to receive the first bit, this one link has received the last bit before the other link has received the last bit.

In accordance with a feature of this invention, counters are provided for keeping track of the respective number of data bits received over each link and when the count in one of the counters indicates that the associated link has received a complete data word, a determination is made whether or not to wait for the slower data link based upon the present count in the other counter associated with this slower data link.

In accordance with another feature of this invention, if the overlap in time during the reception of the data words over the links is within a predetermined time interval, then the data words are compared after both data words have been completely received; however, if the overlap is less than the predetermined time interval, then the data word is gated from the first link to receive the complete data word without waiting for a comparison. Following a comparison of the data words, the data word is gated from the single link designated by information in the data word.

In accordance with another feature of this invention, when the first bit of the next data word is detected, the present data word is gated out without waiting for the slower data link to complete reception of the present data word.

In accordance with still another feature of this invention, circuitry is provided to detect abnormal discontinuities in data reception.

BRIEF DESCRIPTION OF THE DRAWING

The foregoing as well as other objects, features, and advantages of my invention will be more apparent from a description of the drawing in which:

FIG. 2 illustrates the reception circuitry associated with the data link A;

FIG. 3 illustrates the reception circuitry associated with data link B; and

FIG. 4 illustrates the logic implementing the decision capability in the conditional skew compensation circuitry;

GENERAL DESCRIPTION

Figure 1:
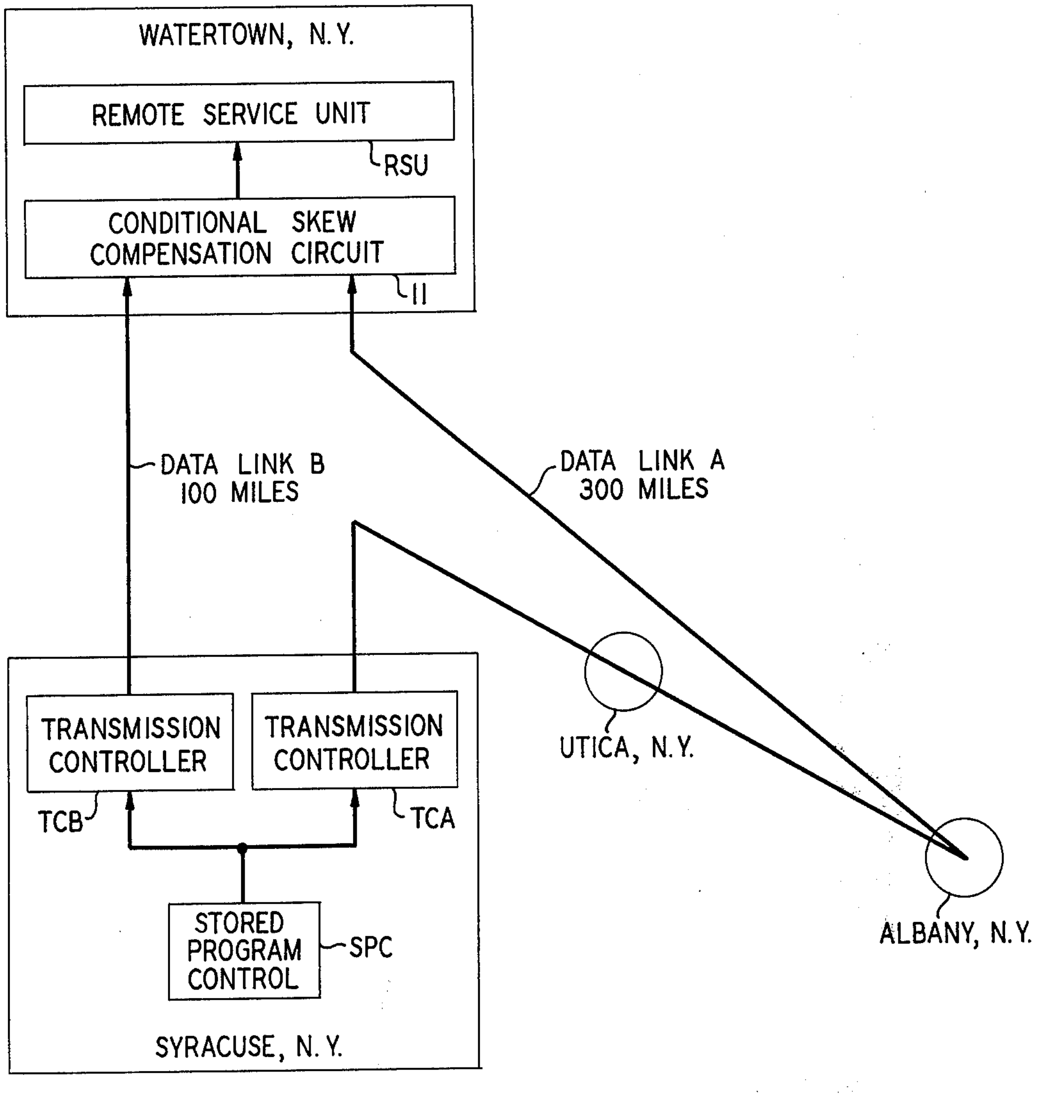
FIG. 1 is a generalized block diagram depicting one illustrative environment in which my conditional skew compensation arrangement may be beneficially utilized.

FIG. 1 is a generalized block diagram illustrating one environment in which this illustrative embodiment of my invention may be beneficially utilized. The primary function of the depicted arrangement is to provide transmission facilities to communicate data words from a processing unit in Syracuse, N.Y., to a remote service unit in Watertown, N.Y. In an effort to geographically separate the data links between the units, data link A is routed from Syracuse through Utica and Albany to Watertown. Data link A is approximately 300 miles long. Data link B runs directly from Syracuse to Watertown, a distance of 100 miles. Data link A is 200 miles longer than data link B. As discussed previously, it is anticipated that data words transmitted concurrently over both data links will arrive in Watertown over link A about 1.2 ms after the data transmitted over link B arrives in Watertown. My invention pertains to the depicted structure and more specifically to the conditional skew compensation circuit 11 in Watertown which is adapted to compensate for this skewing when the two data words arrive within predetermined allowable time limits of each other, as hereinafter described.

The processing unit in Syracuse may be stored program control SPC which is a multiprocessing unit for performing logical and arithemtic operations on data in accordance with its stored program. The SPC is part of a traffic service system known as TSPS No. 1 which is adapted to control the connection of telephone trunks to operator positions for calls instituted from coin stations. The TSPS No. 1 is described in detail in R. J. Jaeger, Jr. et al. U.S. Pat. No. 3,484,560, issued Dec. 16, 1969, and also in Volume 49, of the *Bell System Technical Journal* issued December 1970.

The processing unit in Watertown may be the remote service unit including switch controller and associated concentrator switch described in A. E. Joel, Jr., U.S. Pat. No. 3,731,000, issued May 1, 1974. This unit cooperates with groups of remote telephone trunk circuits to provide operator service under the control of the SPC.

Although this one illustrative embodiment of my invention pertains to a system utilizing data processing apparatus for performing telephone switching operations, it is anticipated that my invention can be utilized in conjunction with any data processing units which communicate over duplicated transmission facilities.

Transmission controllers TCA and TCB comprise well-known apparatus including modems, buffering, and other control equipment for converting binary information from the SPC into modulated signals such as sine waves suitable for transmission over data links.

In accordance with this illustrative embodiment of my invention, the SPC provides 27-bit data words to transmission controllers TCA and TCB at time intervals of approximately 25 ms. Each controller receives the same data words and, in normal operation, controllers TCA and TCB simultaneously transmit each received data word over the respective data links. To elaborate, the controllers serially transmit each of the 27 bits of the data word at a bit frequency of approximately 2,400 Hz. At this frequency, the bits transmitted over shorter data link B will normally arrive at conditional skew concentration compensation circuit 11 three bits ahead of the bits transmitted over longer data link A. After a complete data word has been received over one data link (normally data link B), a check is made to see that data received over the slower data link (normally link A) is not more than 6 bits behind the faster link. For example if the word received over link A is within 6 bits (i.e., the twenty-second bit has been received) then the system waits until the entire word is received over link A, and then a comparison is instituted between both words received over the data links to ensure the integrity of the data. In this comparison each bit in one data word is compared with the corresponding bit in the data word received over the other link. A mismatch indicates an error.

If one data link gets too far ahead of the other data link (i.e., is more than 6 bits ahead), then the first complete data word is immediately gated out without waiting for the complete reception of the data word over the other link thereby allowing remote service unit RSU to operate without delay upon the data word.

It is contemplated that in other embodiments of my invention different allowable count differences will be utilized in accordance with the expected and permissible skew in data word reception.

This illustrative embodiment of my invention can operate to detect two other circumstances in which data reception is abnormal. Circuitry is provided for detecting abnormal discontinuities in data reception. For example if side A receives the first bit of a data word before side B receives the first bit, it is expected that side A will receive the complete word before side B receives the complete word. However, if side B receives the complete word before side A, an abnormal discontinuity in reception by side A is indicated and the data word must be gated from side B.

Additional circuitry is provided for detecting the first bit of a successive data word when a preceding completely received data word has not yet been gated out.

Thus, if side B receives the first bit of the next data word before the preceding word has been gated out of either side, the preceding word is immediately gated out to allow the circuitry to receive the next data word. Both these abnormal circumstances will be described more fully hereinafter in regard to the detailed description of the operation of the circuitry of this illustrative embodiment.

Specific Description

Figure 2:
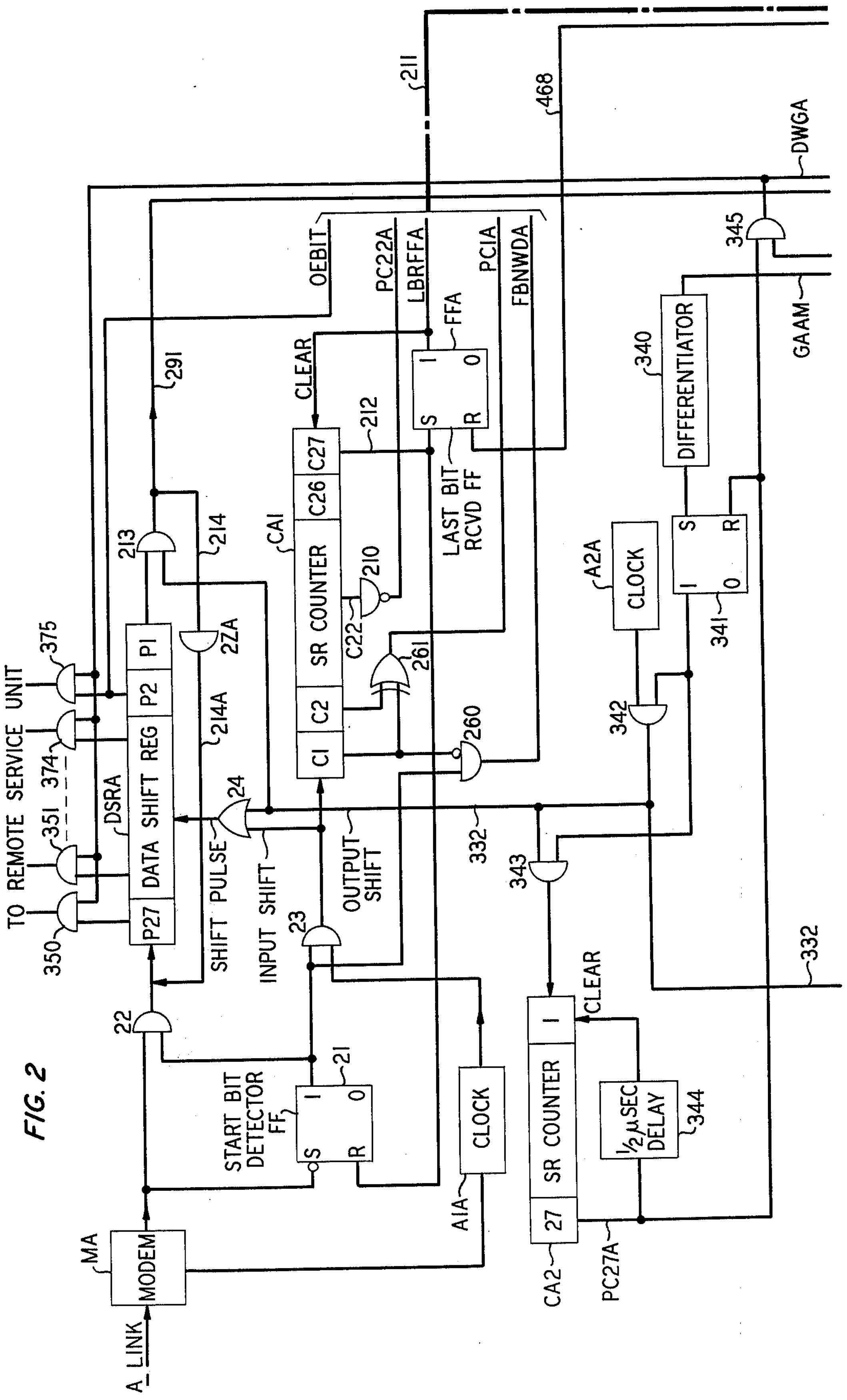
FIGS. 2 through 4 when arranged as shown in FIG. 5 illustrate the circuit elements of the conditional skew compensation circuit 11 shown in FIG. 1; and more specifically
Figure 3:
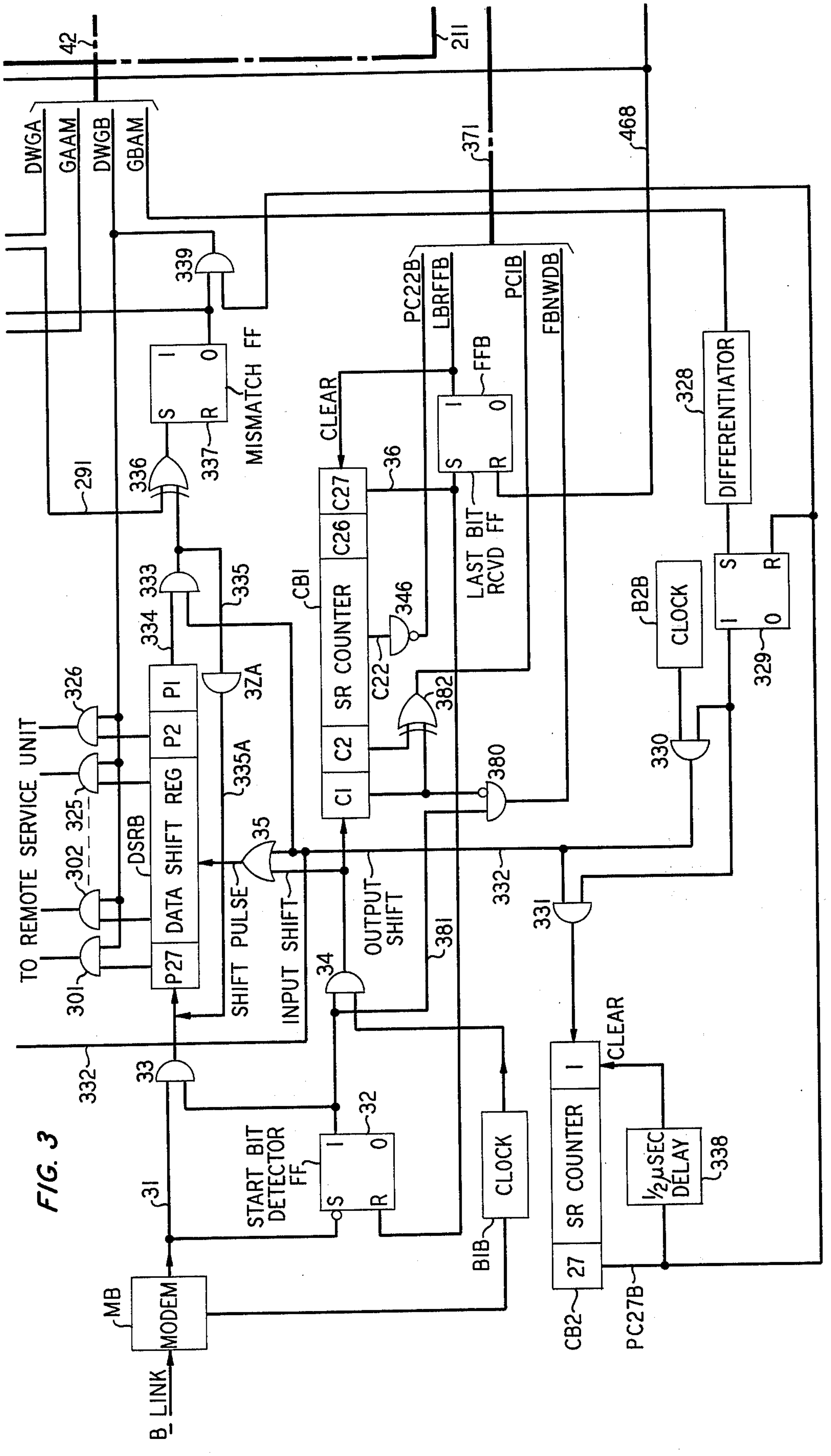
Figures 4, 5:
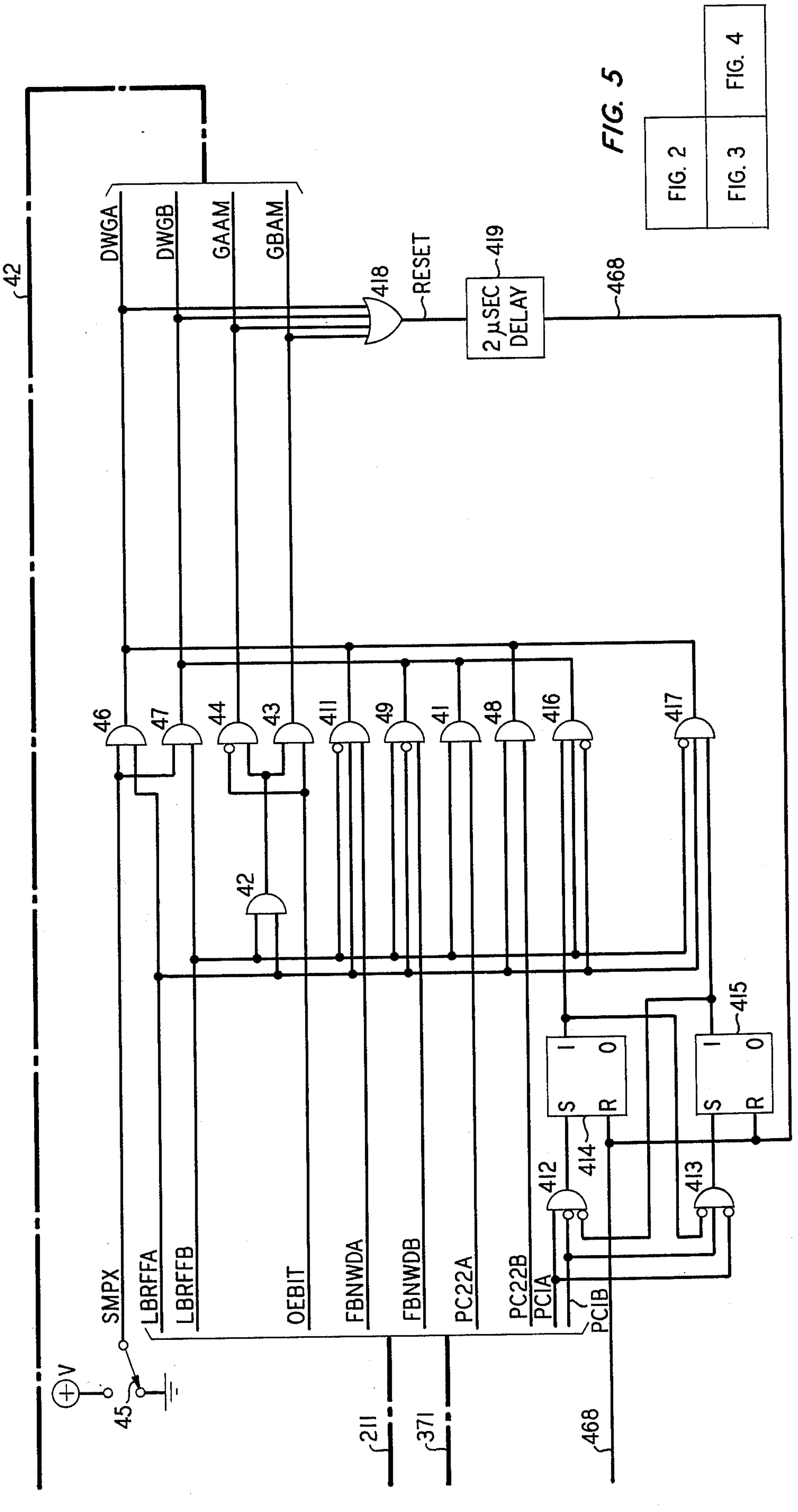
FIG. 5 illustrates how FIGS. 1–4 should be arranged with respect to each other.

FIGS. 2 through 4 illustrate in detail the circuitry of conditional skew compensation circuit 11 of FIG. 1. More specifically FIG. 2 illustrates the reception circuitry associated with data link A, and FIG. 3 illustrates the reception circuitry associated with data link B. (For convenience, the reception circuits associated with the A and B sides will often be referred to as the A and B sides respectively.) FIG. 4 illustrates logic circuitry which operates in conjunction with both reception circuits to make a decision whether to have one side wait for the other side or to immediately gate out the data word stored in one side.

Figure 6:
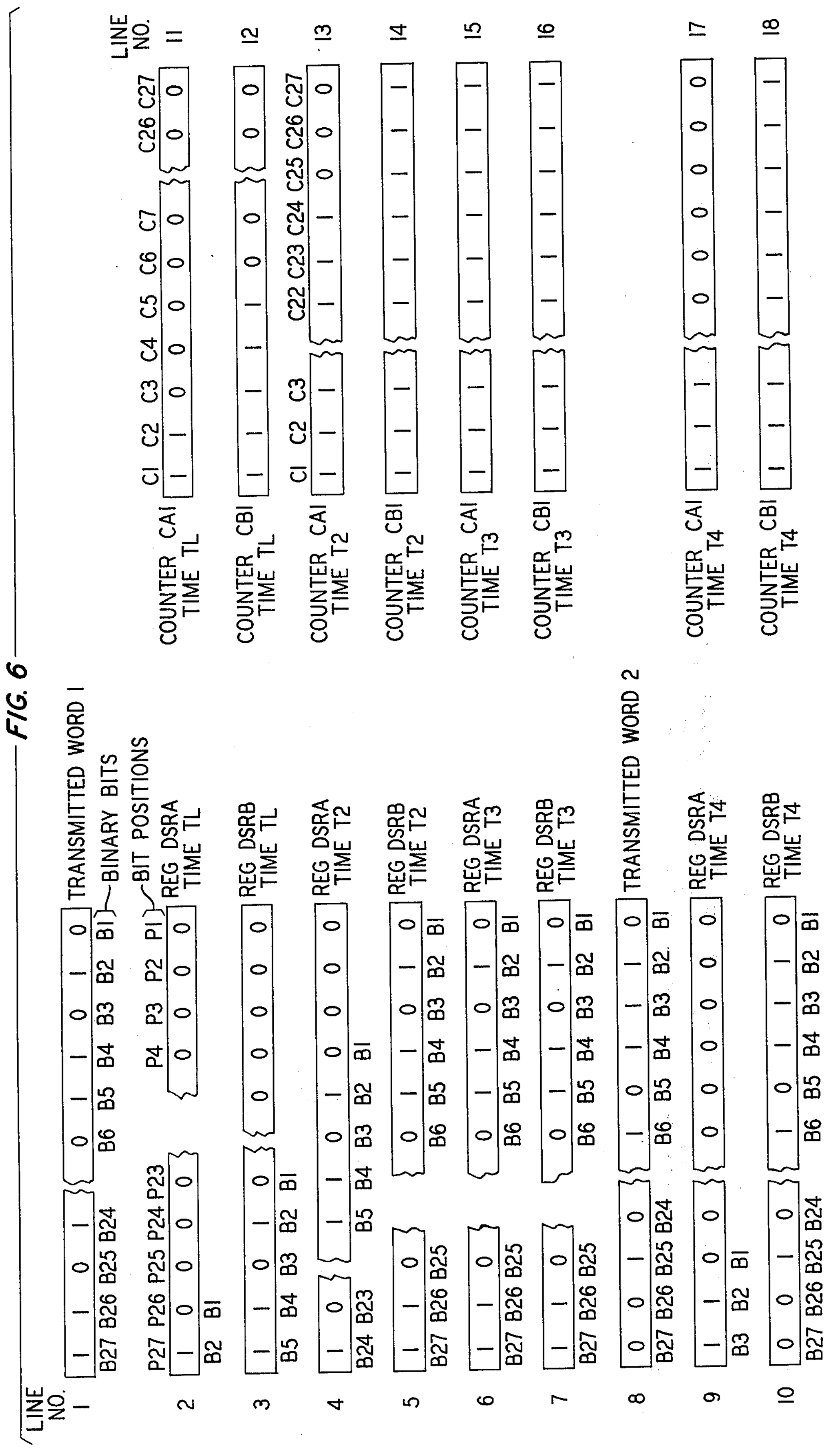
FIG. 6 illustrates several sample transmitted data words and the bits stored in various counters and registers in FIGS. 2 and 3 at various successive times.

To facilitate an understanding of this illustrative embodiment of my invention it will be assumed that the sample data word shown in line 1 of FIG. 6 is serially simultaneously transmitted by transmission controllers TCA and TCB over data links A and B respectively. This data word comprises 27 bits— bit B1 is a 0 which indicates the start of a new data word; bit B2 is an odd-even bit which is described hereinafter; and bits B3 through B27 comprise general information including parity which is utilized at the remote location to perform a specified function such as controlling the operation of a concentrator switch. At this time, all flip-flops are reset, and all data registers and counters contain 0s. In the following description, the designations P1–P27 refer to the stages of shift registers DSRA and DSRB. In contrast, the individual binary data bits are designated B1–B27. These bits B1–B27 are shifted into various of the stages or bit positions P1–P27 as the data words are received, as described hereinafter.

We will assume that this data word is simultaneously transmitted over both data links and that it is first received over data link B. Thus turning to FIG. 3, the first bit B1 is received as a modulated wave over data link B and then is demodulated by modem MB and applied as a low level signal to lead 31 because the bit is a 0. This low signal is inverted at the set input of start bit detector flip-flop 32 and sets this flip-flop. The 1 output of this flip-flop goes HIGH to partially enable gate 33 to apply the 0 data bit to data shift register DSRB. In the drawing, the small circle shown at the inputs to some of the gates and flip-flops, such as 32, represents a well-known inverter, which inverts the signals applied to these input leads.

Figure 9:
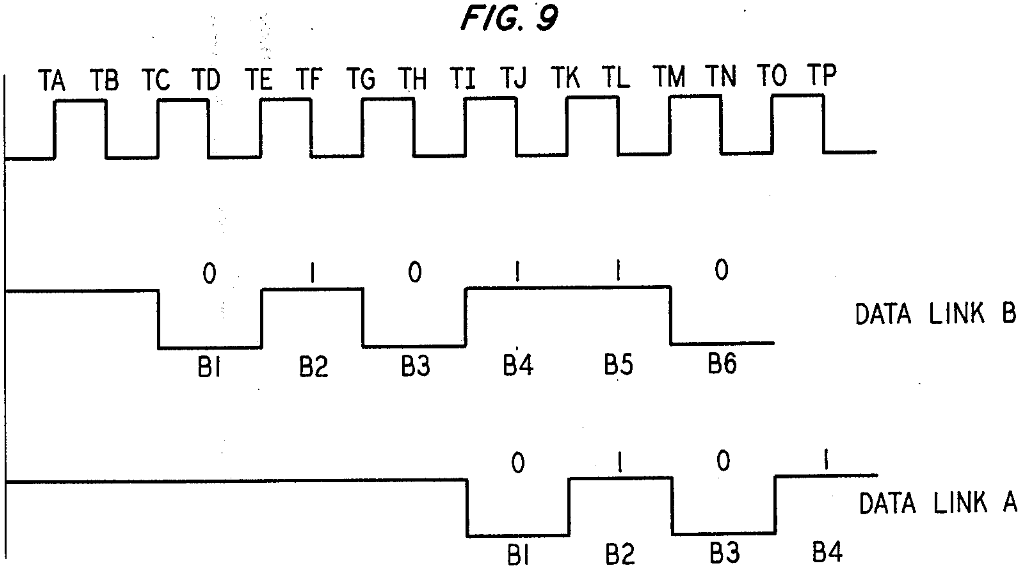
FIG. 9 illustrates the time relationship between incoming data bits and clock pulses generated by circuitry in FIGS. 2 and 3.

Data shift register DSRB is a well-known shift register having 27-bit positions corresponding to the 27 bits of each transmitted data word. The LOW signal applied to the register from gate 33 is not gated into register DSRB until a shift pulse is applied thereto as described below. More specifically, the HIGH signal from the 1 output of start bit detector flip-flop 32 also applies a HIGH level to the upper input lead of gate 34. This gate then outputs the clock wave applied from clock B1B. Clock B1B is synchronized with the incoming data over the B link and generates a 2,400-Hz square wave such as shown in the upper portion of FIG. 9. The lower portion of FIG. 9 shows the first six bits B1–B6 of transmitted data word 1 in FIG. 6 as the word is serially received, as described below.

To continue, the output of gate 34, which now follows the square wave output from clock B1B, applies a HIGH level signal to OR gate 35 whenever the clock signal is HIGH. Thus gate 35 applies a HIGH output pulse to register B during each of the following time intervals TC–TD, TE–TF, TG–TH, etc., as illustrated in FIG. 9. Register DSRB is adapted such that the output signal from gate 33 representing a data bit is inserted in the register only during the negative transitions of the signal applied from gate 35. Thus, register DSRB shifts the entire contents of the register one-bit position to the right on each of the following negative transitions shown in FIG. 9 (e.g., at times such as TD, TF, TH, TJ, etc.). Thus, although the 0 representing bit B1 is applied to register DSRB during the time interval from TC to TE, the 0 bit is not gated into the register until time TD. Also at time TD, the output of gate 34 goes LOW and this negative transition causes a 1 to be inserted in the first bit position of shift register counter CB1. As mentioned previously this counter formally contained all 0s and is utilized to count the number of bits received by the B side. The signal 1 inserted in the register indicates that only one bit has been received.

At time TE, modem MB applies bit B2 over output lead 31. This 1 bit is inserted in register DSRB at time TF in a manner identical to that by which bit B1 was inserted. Moreover, at time TF, a second 1 is inserted in shift register counter CB1 to indicate that the second bit of the data word has been received. In a similar manner, bit B3 is inserted in register DSRB at time TH and a third 1 is inserted in counter CB1 so that the first three-bit positions C1–C3 of counter CB1 each contain a 1 while the other bit positions still contain 0s.

At times TI, it is anticipated that data word 1 applied over the A link should now reach modem MA because link A induced about a 3-bit delay. Returning to FIG. 2, the output of modem MA goes LOW when bit B1 is received setting start bit detector flip-flop 21. The 1 output of this flip-flop goes HIGH enabling gate 22 to serially apply each of the bits of the data word to register DSRA. Register DSRA is identical to register DSRB previously described and has 27 stages for storing 27 bits. Clock A1A like clock B1B is a 2,400-Hz clock and is synchronized with the data arriving over A link. For simplicity of explanation, it has been assumed that both clocks are perfectly synchronized. However, this is not a requirement of this illustrative embodiment, and in some applications of my invention, these clocks need not be synchronized at all times. Clock A1A applies the square wave previously shown in FIG. 9 to gate 23. The output of gate 23 causes OR gate 24 to go HIGH whenever the clock pulse is HIGH. Register DSRA like register DSRB shifts all bits one position to the right only on negative transitions of the output from OR gate 24. Thus with reference to FIG. 9 on the negative transition of the clock pulse from clock A1A at time TJ, the 0 or start bit is inserted in the leftmost bit position of data shift register DSRA and all the other 0 bits are shifted one position to the right. Concurrently therewith, the negative transition of the output of gate 23 causes a 1 to be inserted in the first bit position (C1) of shift register counter CA1. Counter CA1 is structurally and functionally identical to counter CB1 whose operation was previously described in relation to FIG. 3. Counter CA1 has 27-bit positions which are initially all 0s, but a 1 is shifted into this register each time a new data bit is shifted into register DSRA. Thus 1s are shifted into counter CA1 to record the number of data bits which are stored in register DSRA. Each of the other bits of data word 1 is received by the A side in a similar manner. Thus bits B2 and B3 are shifted into register DSRA at time TL and TN respectively, and a 1 is shifted into counter CA1 at each of these times. While the A side (data register DSRA) was receiving bit B1 of data word I, the B side (shift register DSRB) was receiving bit B4 as shown in FIG. 9. Now turning to lines 2 and 3 in FIG. 6, it is seen that at time TL data shift register DSRA has received only bits B1 and B2 of data word 1 while shift register DSRB, at time TL has received bits B1–B5. Thus the B side is 3 bits ahead of the A side. Relative placement of the received data bits in the registers is also illustrated and indicates the manner by which, as each successive data bit is received, the previously received data bits are each shifted 1-bit position to the right. The respective bits in counter CA1 and CB1 at times TL are shown in lines 11 and 12 of FIG. 6. Only bit positions C1 and C2 in counter CA1 contain 1s because only two data bits have been received by register DSRA. Bit positions C1–C5 of counter CB1 contain 1s because register DSRB has received five data bits B1–B5.

At time T2, approximately 22 clock pulses later (this time is many clock pulses after time TP in FIG. 9), the respective bit structures of registers DSRA and DSRB are shown in lines 4 and 5 of FIG. 6. It is seen that register DSRA has received 24 bits B1–B24 of the transmitted data word 1, while shift register DSRB has received the complete data word comprising bits B1–B27. Lines 13 and 14 in FIG. 6 illustrate the binary characters in counters CA1 and CB1 at time T2. Counter CB1 contains all 1s since the B side has received a complete word, and counter CA1 has 1s in only positions C1–C24.

In accordance with this illustrative embodiment of my invention, the logic circuitry in FIG. 4 makes a determination when the B side receives the last bit whether to immediately gate the complete data word out of register DSRB or to wait for register DSRA to receive the data word before gating out both data words for comparison. As described hereinbefore, since counter CA1 at time T2, as shown in line 13 of FIG. 6, is within six counts of counter CB1 at time T2 as shown in line 14 of FIG. 6, the system will wait for the arrival of the data word over data link A prior to gating out both data words for comparison.

More specifically when a 1 is shifted into the twenty-seventh bit position C27 of shift register counter CB1 in FIG. 3, output lead 36 goes HIGH, because of the 1 inserted in this position, to set last bit received flip-flop FFB and to reset start bit detector flip-flop 32 to inhibit the further gating of any data words into register DSRB by gate 33. Resetting flip-flop 32 also inhibits the further application of shift pulses to register DSRB. Thus the complete data word is stored in register DSRB and is not further shifted at this time. The 1 output of last bit received flip-flop FFB goes HIGH clearing shift register counter CB1 so that it now contains all 0s. As hereinafter described, flip-flop FFB is reset at a subsequent time allowing sufficient time for the circuitry in FIG. 4 to operate. A HIGH signal is conveyed over lead LBRFFB from flip-flop FFB to logic in FIG. 4. When this lead goes HIGH, it indicates that side B has received the last bit of a data word.

Turning now to shift register counter CA1 in FIG. 2, the contents of which are shown at line 13 of FIG. 6, it is seen that bit position C27 contains a 0 so that last bit received flip-flop FFA is not set via lead 212. However, since bit position C22 contains a 1, the output of this position is inverted by gate 210 and lead PC22A goes LOW. This lead when LOW indicates that side A has received the 22nd bit of a transmitted data word. This lead is included in cable 211 and reappears in FIG. 4. Since lead LBRFFB is HIGH as discussed above, the upper input to gate 41 in FIG. 4 is HIGH. Each of the other leads in the drawing, which are included in cables such as cables 211, 371, and 42, reappear at the termination of the cable and have the same lead designation as they did at the start of the cable. Thus for example, lead LBRFFB in FIG. 3 is included in cable 371 and reappears as the same lead LBRFFB in FIG. 4. Since lead PC22A is LOW, the output of gate 41 remains LOW. Thus as described hereinafter, the data word in register DSRB will not be immediately gated out, but the system will wait for side A to receive the entire word.

However, if register DSRB had received the complete data word, then lead LBRFFB would have been HIGH; and if register DSRA had not received the 22 bit then lead PC22A would also have been HIGH because position C22 would contain a 0. Then the output of gate 41 would go HIGH causing lead DWBG to go HIGH. This lead is in cable 42 and continues into the same lead DWBG in FIG. 3. The HIGH level of this lead causes gates 301–326 to immediately gate the data word stored in register DSRB to the remote service unit, without any comparison with the partially received data word in register DSRA.

However, returning to the instant example of transmitted data word 1, the system waits for register DSRA to receive the complete word before gating out both words for comparison. Turning to lines 6 and 7 of FIG. 6, it is seen at time T3, which is 3 clock pulses after time T2, that shift register DSRA and shift register DSRB have now both received the data word. Moreover, turning to lines 15 and 16 of FIG. 6 counters CA1 and CB1 now both contain all 1s thereby indicating that each side has received all twenty-seven bits of the data word. When a 1 was shifted into the 27th bit position C27 of counter CA1 in FIG. 2, the output of lead 212 went HIGH setting last bit received flip-flop FFA and also resetting start bit detector flip-flop 21. The 1 output of flip-flop 21 goes LOW inhibiting gate 22 from applying any further bits to register A and also inhibiting gate 23 from applying any further clock pulses to counter CA1 or shift register DSRA. The setting of last bit received flip-flop FFA causes the 1 output to go HIGH clearing counter CA1 to its initial state of all 0s. Lead LBRFFA goes HIGH to indicate that side A has received the last bit. This lead is conveyed through cable 211 to FIG. 4. Now since both leads LBRFFA and LBRFFB are HIGH, the output of gate 42 in FIG. 4 goes HIGH to indicate that both sides have received the last data bit.

Both data words, as described hereinafter, are now serially gated out and compared bit by bit. If this comparison is successful, then the remote service unit in FIG. 1 can act upon the data word stored in either register DSRA or register DSRB. However, the choice of register from which the word is actually gated out is specified by bit B2 in register DSRA (i.e., the odd-even [O-E] bit in register DSRA). If bit B2 is a 1, the word is gated from register DSRB and if bit B2 is a 0, the word is gated from register DSRA. Since in transmitted data word 1 as illustrated in line 1 of FIG. 6 bit B2 is a 1, lead OEBIT in FIG. 2 is HIGH. This lead is conveyed through cable 211 to gate 43 in FIG. 4. Gate 43 generates a HIGH output because, as described previously, the output of gate 42 is HIGH indicating that both sides have received the last bit and lead OEBIT is also HIGH. Thus lead GBAM in FIG. 4 goes HIGH. This lead is included in cable 42 which terminates in FIG. 3. The HIGH signal on lead GBAM is applied to differentiator 328 in FIG. 3. The operation of this differentiator will be described in detail hereinafter in regard to FIGS. 7 and 8. In response to the HIGH signal on lead GBAM, differentiator 328 generates a HIGH pulse of short duration to set flip-flop 329. The 1 output of flip-flop 329 goes HIGH partially enabling gates 330 and 331. Clock B2B is also connected to gate 330. Clock B2B generates a square wave having the same shape as the waveform of FIG. 9. However, the frequency of this square wave is about 200 times that of clocks A1A and B1B. Clock B2B provides a 460 kHz square wave whereas clocks A1A and B1B provide a 2,400 Hz square wave.

As described below, clock B2B in conjunction with other logic serves to shift out the data in registers DSRA and DSRB out for a bit-by-bit comparison. More specifically when the output of clock B2B goes HIGH, gate 330 generates a HIGH output which is applied over lead 332 to gate 333 in FIG. 3 and 213 in FIG. 2. The 0 in start bit position P1 of register DSRB is applied to gate 333 via lead 334, and the 0 in start bit position P1 of register DSRA is applied to gate 213. Gates 213 and 333 both generate LOW outputs which are respectively applied to EXCLUSIVE OR gate 336 in FIG. 3 via leads 291 and 335. Gate 336 compares the 0 bits and since they both match, gate 336 continues to generate a LOW output and mismatch flip-flop 337 is not set to indicate an error. As discussed below, each of the other bits in data registers DSRA and DSRB is shifted out and compared by gate 336.

The HIGH output of gate 330 in FIG. 3 also applies a HIGH input to OR gate 35 via lead 332. Then the output of gate 35 goes HIGH. On the negative transition of clock B2B the output of gate 330 goes LOW causing the output of gate 35 to go LOW which causes the contents of register DSRB to shift 1-bit position to the right. As the data word is serially shifted out of register DSRB, it is reinserted by lead 335, AND gate 3ZA and lead 335A in the lefthand side of the register. Like the shifting out of bits from the register, the bit reinsertion also occurs on negative transitions of clock B2B. When bit B1 originally in position P1 is shifted out of register DSRB, it is reinserted in position P27. Thus, the 0 in position P1 is reinserted as a 0 in position P27 and the 1 in position P2 is shifted into position P1 and so on.

At the same time that the contents of register DSRB are shifted to the right, the contents of register DSRA are simultaneously shifted to the right. Lead 332 from gate 330 in FIG. 3 is also connected to gates 24 and 213 in FIG. 2. When lead 332 goes HIGH, following clock B1B as discussed previously, gate 213 is partially enabled. The 0 in the start bit position P1 of the word in register DSRA is also applied to this gate. Thus the output of gate 213 remains LOW. On the negative transition of clock B2B, the output of gate 330 goes LOW causing the output of OR gate 24 in FIG. 2 to go from a HIGH to a LOW state causing the contents of register DSRA to shift 1-bit position to the right. Now the 1 formerly in bit position P2 is shifted into bit position P1 and the 0 bit output by gate 213 is reinserted in position P27 via lead 214, gate 2ZA and lead 214A. After this shift, the upper input to gate 213 goes HIGH because a 1 is now in position P1.

Thus register DSRA shifts concurrently with registers DSRB under the control of clock B2B. In 1 in bit position P2 in register DSRB was shifted into bit position P1 as described previously and the upper input of gate 333 goes HIGH. When clock B2B goes HIGH for the second time during the second clock pulse, the output of gate 330 goes HIGH causing the output of gates 333 and 213 to go HIGH because bit position P1 in registers DSRA and DSRB both contain a 1. Thus both inputs to EXCLUSIVE OR gate 336 (leads 291 and 335) go HIGH as the second bit in each data word is compared and the output of gate 336 remains LOW because both bits match.

Shift register counter CB2 in FIG. 3 is identical to shift register counter CB1 previously described and serves to count the number of bits which are serially gated out of the data registers for comparison. Counter CB2 initially contains all 0s, and a 1 is inserted in the first bit position of the register on each of the negative transitions of the output of gate 331 which occurs when the output of clock B2B goes LOW. Thus on the first negative transition of clock B2B when the contents of registers DSRA and DSRB were first shifted, a 1 was inserted in counter CB2.

At the termination of the second clock pulse described previously, the output of gate 331 goes LOW from its previous HIGH level shifting a second 1 into shift register counter CB2. This register now contains /s in its first two bit positions indicating that two bits of the data words in registers DSRA and DSRB have been compared. Counter CA2 in FIG. 2 is not utilized when clock B2B controls the comparison, but operates exactly like counter CB2, as described above, when clock A2A controls the comparison.

In a similar manner, each of the next 25 bits in registers DSRA and DSRB is successively applied through gates 213 and 333 for comparison by EXCLUSIVE OR gate 336. On each shift of the contents of registers DSRA and DSRB, the respective outputs of gates 213 and 333 are reinserted as inputs to the registers over leads 214A and 335A respectively. Thus after the twenty-seventh shift, the original data word in each register is returned to its former position. Thus bits B1–B27 are in positions P1–P27 respectively. Moreover, when the 27th 1 is shifted into counter CB2, output lead PC27B goes HIGH to reset flip-flop 329 to inhibit the further application of clock pulses to registers DSRA and DSRB. The HIGH output on lead PC27B also causes delay circuit 338 to apply a HIGH signal to counter CB2 after a ½-μs delay to return counter CB2 to its initial state of all 0s. The HIGH level on lead PC27B is also applied to gate 339 in FIG. 3 which is also responsive to the state of mismatch flip-flop 337. Since in the prior example each of the bits in registers DSRA and DSRB match, flip-flop 337 remains reset and the 0 output of this flip-flop applies a HIGH level to the upper input of gate 339. The output of gate 339 goes HIGH enabling gates 301–326 to gate the data word in shift register DSRB to the remote service unit.

In the prior example, if bit B2 (odd-even bit) in register DSRA had been a 0 indicating that the data word should be shifted out from register DSRA after a successful match, then gate 44 in FIG. 4 would have generated a HIGH output instead of gate 43 as described previously. The HIGH level signal on lead GAAM is applied to differentiator 340 in FIG. 2 which generates a HIGH pulse of short duration to set flip-flop 341. The 1 output of this flip-flop would go HIGH partially enabling gates 342 and 343. Clock A2A is identical to previously described clock B2B and generates a square wave at the frequency of 460 kHz. The output of gate 342 is also connected to lead 332 and controls the shifting and comparison of the data bits in registers DSRA and DSRB in an identical manner to that previously described in which the output of gate 330 controlled this shifting and bit comparison. The only difference in operation is that 1s are now inserted in counter CA2 rather than counter CB2, and when the 27th 1 is inserted in counter CA2, the output of lead PC27A goes HIGH causing counter CA2 to be cleared after a ½-μs delay generated by delay circuit 344. This HIGH signal on lead PC27A also clears flip-flop 341 and causes gate 345 to be enabled if the 0 output of mismatch flip-flop 337 is HIGH indicating all the bits in register DSRA match corresponding bits in register DSRB. The output of gate 345 goes HIGH applying HIGH level inputs to gates 350–375 to gate the word in register DSRA to the remote service unit.

Thus, I have described a redundant mode of operation and the expected manner in which a data word will be received over data links A and B. The B link received the data word three time or bit counts ahead of the A side and the logic circuitry caused the B side to wait until the A side had received the complete word. Then, the data words in registers DSRA and DSRB were concurrently shifted bit-by-bit for comparison. Since this comparison was successful as evidenced by the failure to set mismatch flip-flop 337, the data word was gated out of either register DSRA or register DSRB depending upon whether the odd-even bit in bit position B2 was a 0 or 1, respectively. When mismatch flip-flop 337 is set to indicate a mismatch, diagnostic circuitry (not shown) resets the flip-flop and performs other operations in an attempt to discover the cause for such a mismatch.

Unitary Mode of Operation

Another operating mode of this illustrative embodiment of my invention will now be described. In a unitary mode of operation, it is desired to gate the data word out of a register as soon as the complete data word is received. In this unitary mode, unlike the previously described redundant mode, no comparisons are made between the data words.

Turning now to FIG. 4, when a unitary mode is specified, lead SMPX is HIGH because switch 45 is connected to a positive voltage source. In normal redundant operation, as described previously, switch 45 is connected to ground as depicted in FIG. 4. However, in the unitary mode the upper inputs to gates 46 and 47 are held HIGH. Assuming side B is the first side to receive the last bit, lead LBRFFB will go HIGH when last bit received flip-flop FFB is set by counter CB1. Then, the output of gate 47 goes HIGH applying a HIGH signal to lead DWGB. The HIGH signal on lead DWGB, as discussed previously, immediately gates the data word in register DSRB to the remote service unit by enabling gates 301–326.

In contrast, if the A side is the first side to receive the last bit, then last bit received flip-flop FFA would be set before flip-flop FFB is set and lead LBRFFA would convey a HIGH input to gate 46. The HIGH output of gate 46 would be conveyed via lead DWGA to gates 350–375 causing the data word in register DSRA to be immediately gated to the remote service unit.

Redundant Mode Example in Which One Side Does not Wait for the Other Side to Receive the Complete Data Word Turning now to FIG. 6, we will consider the manner in which the system responds in a normal redundant mode (i.e., lead SMPX is LOW) to transmitted data word 2 shown in line 8. In this example, it is assumed that transmission controllers TCA and TCB in FIG. 1 do not transmit data word 2 simultaneously. Controller TCA transmits the data word significantly behind the transmission of the data word by controller TCB. With reference to lines 9 and 10 in FIG. 6, at time T4 which is over 25 ms after time T3, it is seen that data register DSRA has received three bits B1–B3 of transmitted data word 2, whereas register DSRB has received the entire data word comprising bits B1–B27. Line 17 shows the bits stored in counter CA1 at time T4 indicating that only three bits have been received by register DSRA. Counter CB1 in line 18 contains 1s in all bit positions because the entire data word has been received by register DSRB. These words are received by the A and B sides in the manner described previously in regard to transmitted data word 1. As discussed previously, last bit received flip-flop FFB is set when a 1 is shifted into bit position C27 in counter CB1. Thus lead LBRFFB is HIGH. Since bit position C22 of counter CA1 shown at line 17 in FIG. 6 still contains a 0 indicating that register DSRA has not received the 22 bit of data word 2, the output of inverter gate 210 in FIG. 2 is HIGH. Thus lead PC22A conveys a HIGH signal to the logic circuitry in FIG. 4. Since leads LBRFFB and PC22A are both HIGH, the output of gate 41 goes HIGH causing lead DWGB to go HIGH which in turn gates the data word in register DSRB to the remote service unit. Thus the data word in register DSRB is immediately gated out without waiting for the A side to receive the complete data word. This is done when the reception of a data word by the A side is more than six bits behind the reception of the data word by the B side. Thus, skew compensation is provided only when both data words are received within an expected time interval.

If register DSRA had received the complete word when register DSRB had not yet received the 22 bit, then lead LBRFFA would be HIGH because last bit received flip-flop FFA was set. Lead PC22B would also be HIGH because position C22 of counter CB1 contains a 0 which is inverted by gate 346. Now, gate 48 in FIG. 4 would apply a HIGH output over lead DWGA causing the data word in register DSRA to be gated out by gates 350–375. Thus when the A side receives the data word more than 6 bits ahead of its reception by the B side, then the complete data word is gated from the A side without waiting for the B side to receive the complete word.

Reception of Next Word Before Instant Word has been Gated out

This illustrative embodiment of my invention is also adapted to detect certain other situations in the transmission of data words in which corrective action is required. In particular, the system can detect if one side receives the first bit of the next data word before the present complete data word has been gated out of the register associated with that one side.

For example, we will assume that register DSRB has received a complete data word so that the output of lead 36 from counter CB1 is HIGH setting last bit received flip-flop FFB. Thus the output over lead LBRFFB is HIGH. We will also assume that register DSRA has not received the last bit and therefore, last bit received flip-flop FFA is reset and lead LBRFFA is LOW. We will further assume that the first bit of the next word is received over the B link by modem MB.

As discussed previously, start bit detector flip-flop 32 is reset at the same time that the last bit received flip-flop FFB is set, and shift register counter CB1 is cleared to an all 0 state when the 1 output of last-bit-received flip-flop FFB went HIGH. As mentioned previously, the first bit or start bit of each new data word is a 0. Thus, when modem MB receives the first bit of a new data word, lead 31 goes LOW causing start bit detector flip-flop 32 to be set partially enabling gates 33 and 34. Thus the 0 bit is applied to register DSRB as the LOW output of gate 33. However as discussed previously this bit is not gated into the register until a negative transition of clock B1B. The setting of start bit detector flip-flop 32 also applies a HIGH input to gate 380 over lead 381. Since bit position C1 of counter CB1 contains a 0 because the counter was cleared, the output of gate 380 goes HIGH applying a HIGH signal to the logic in FIG. 4 over lead FBNWDB. When this lead goes HIGH, it indicates that the first bit of the next word had been detected by side B, but this bit has not yet been gated into register B. In this example, since lead LBRFFB is HIGH, lead LBRFFA is LOW, and FBNWDB is HIGH, gate 49 in FIG. 4 generates a HIGH output which is applied over lead DWGB to immediately gate the data word out of data shift register DSRB. The data word in register DSRB is gated out while the output of clock B1B was still HIGH. Therefore the negative going transition which shifts the contents of register DSRB has not yet caused register DSRB to accept the 0 from the next data word which is applied as the output of gate 33. Thus, after the first bit was detected by side B, but before this bit was gated into register DSRB, the present word in register DSRB was gated out so that register DSRB could accept the new word.

It should be noted that the present contents of register DSRB which has already been gated out is always shifted over lead 334 as each bit of a new word is gated into the register. However, since gate 333 is not enabled by a HIGH signal on lead 332, the present contents of the register is lost as it is shifted out as the new word is shifted into the register. The same is also true in regard to the contents of register DSRA. When a new word is being shifted in, the present bits are shifted out and lost since gate 213 is not enabled over lead 332.

Thus in the preceding example, side B detected the presence of a new word before the present complete word had been gated out of register DSRB. Last bit received flip-flop FFB was set while last bit received flip-flop FFA was reset. A HIGH signal was generated over lead FBNWDB in FIG. 3 to indicate the detection of the new word. These three conditions caused gate 49 to generate an output which immediately gated the data word out of register DSRB.

In the preceding example, if register DSRA detected the first bit of a new word before the complete word in register DSRA had been gated out, then, in a manner identical to that described previously, start bit detector flip-flop 21 would be set by the first bit of the new word and would apply a HIGH signal to gate 260. Since bit C1 of counter CA1 is a 0 because the counter was cleared, the output of gate 260 would go HIGH applying a HIGH signal to the circuitry of FIG. 4 over lead FBNWDA. Last bit received flip-flop FFA would be set indicating that side A had received the last bit of a data word and accordingly lead LBRFFA would be HIGH. Since side B had not received the last bit, last bit received flip-flop FFB would not be set and lead LBRFFB would be LOW. Now gate 411 in FIG. 4 would generate a HIGH output which is applied over lead DWGA to immediately gate the data word in register DSRA before the negative transition of the shift pulse applied by gate 24 which would cause register DSRA to accept the first bit of the new word applied as the output of gate 22.

Abnormal Discontinuities in Data Reception

This illustrative embodiment of my invention is also adapted to detect certain abnormal discontinuities in data reception. More specifically if one side was the last to receive the first bit, but that one side has received the last bit before the other side has received the last bit, this normally indicates that the reception of data bits by the other side was interrupted. When this occurs, it is essential that the complete data word be immediately gated out of the one side without delay, in order that the system can further continue its operation.

Turning now to FIG. 2, EXCLUSIVE OR gate 261 is responsive to the bits in the first two positions of shift register counter CA1—namely bit positions C1 and C2. The output of gate 261 goes HIGH only when position C1 contains a 1 and position C2 contains a 0. (The condition where C1 contains a 0 and C2 contains a 1 is not possible because 1s are always shifted toward the righmost positions.) Counter CA1 can only be in this state rightmost 0 in C1, and 1 in C2) immediately after receiving the first 1 from gate 23 indicating that the first data bit was received by the A side. When the second data bit is received, as described previously, a second 1 is shifted into counter CA1. Thus positions C1 and C2 both contain 1s and the output of gate 261 resumes its normal LOW state. Thus output lead PC1A from gate 261 goes HIGH only during the single time interval beginning after the first data bit is shifted into register DSRA and ending when the second data bit is shifted into register DSRA.

A corresponding EXCLUSIVE OR gate 382 is shown in FIG. 3. This gate is responsive to the bits in positions C1 and C2 of shift register counter CB1. In an identical manner to that described above, gate 382 generates a HIGH output only when position C1 contains a 1 and position C2 contains a 0 to indicate that only the first data bit has been shifted into register DSRB. The outputs of gates 261 and 382 are respectively designated PC1A and PC1B and extend into FIG. 4. Lead PC1B goes HIGH to indicate that side B has received the first data bit.

Flip-flops 414 and 415 in FIG. 4, as described below, designate whether the A side or the B side was the first to receive the first bit of a transmitted data word. More specifically, flip-flop 414 is set only if the A side was the first to receive the first bit. Gate 412 generates a HIGH signal only if lead PC1A is HIGH to indicate that side A has received the first bit and lead PC1B is LOW to indicate that side B has not received the first bit. The bottom input of gate 412 is responsive to the state of the other flip-flop 415. Gate 412 will generate a HIGH output only if flip-flop 415 is reset indicating that the B side has not yet been designated as the first side to receive the first bit. Thus flip-flop 414 is set only if flip-flop 415 is not set and the above conditions are met. When flip-flop 414 is set it indicates that the A side was the first side to receive the first bit.

Gate 413 generates a HIGH output to set flip-flop 415 only if (1) flip-flop 414 is reset (2) lead PC1B is HIGH indicating the B side has just received the first bit, and (3) lead PC1A is LOW indicating that the A side has not just received the first bit. When flip-flop 415 is set it indicates that the A side was the first side to receive the first bit of the instant word.

Gate 416 is responsive to the 1 output of flip-flop 414 for generating a HIGH signal only if (1) flip-flop 414 is set to indicate that the A side was the first to receive the first bit (2) lead LBRFFB is HIGH to indicate that side B has received the last bit, and (3) lead LBRFFA is LOW to indicate that side A has not received the last bit. Thus gate 416 generates a HIGH output only if the B side was the last to receive the first bit, but has received the last bit and the A side has not received the last bit. Lead DWGB also goes HIGH enabling gates 301 to 326 to gate the word out of data shift register DSRB.

Gate 417 is responsive to the state of flip-flop 415 and generates a HIGH output only if (1) flip-flop 415 is set to indicate that the B side was the first to receive the first bit (2) lead LBRFFA is HIGH and (3) lead LBRFFB is LOW. Thus gate 417 generates a HIGH output over lead DWGA to enable gates 350–375 to gate the data word out of data shift register DSRA, only when the A side was the last to receive the first bit, but has received the last bit and the B side has not yet received the last bit.

Whenever one of the leads DWGA, DWGB, GAAM, or GBAM in FIG. 4 goes HIGH, gate 418 generates a HIGH output which is conveyed via lead 468 to the reset leads of flip-flops 414–415 2 μs after delay 419 is enabled. Delay 419 generates a pulse of short duration to reset flip-flops 414 and 415, so that these flip-flops can be used in regard to the next data word to indicate which side was the first to receive the first bit. Lead 468 is also connected to flip-flops FFA and FFB and resets these flip-flops at the same time flip-flops 414–415 are reset.

Reference Table for the Logic Gates in FIG. 4

The table below indicates by way of a summary the conditions under which the gates illustrated in FIG. 4 provide output signals which serve to control the gating out and/or comparison of the data words received by the A and B sides. Each of the modes and abnormal conditions referred to in the table has been previously described in detail.

| Gate No. | Mode or Abnormal Condition Detected | Condition(s) Under Which Output Signal is Generated | Action Instituted |
|---|---|---|---|
| 46 | unitary mode | side A is the first side to receive the complete data word | gate data word from side A (register DSRA) |
| 47 | unitary mode | side B is the first side to receive the complete data word | gate data word from side B register (DSRB) |
| 44 | redundant mode, overlap during data word reception is within predetermined time interval | both sides have received complete data word and bit B2 is a O | compare data words in registers DSRA and DSRB, and then gate data word from register DSRA |
| 43 | redundant mode, overlap during data word reception is within predetermined time interval | both sides have received complete data word and bit B2 is a 1 | compare data words in registers DSRA and DSRB, and then gate data word from register DSRB |
| 411 | next word detected by side A before present word has been gated out of a register | B side has not received last bit of present word,<br>A side has received last bit of present word, and<br>A side has detected first bit of next word | gate data word from side A (register DSRA) |
| 49 | next word detected by side B before present word has been gated out of a register | B side has received last bit of present word,<br>A side has not received last bit of present word, and<br>B side has detected first bit of next word | gate data word from side B (register DSRB) |
| 41 | redundant mode, A side too far behind B side | B side has received last bit of data word,<br>A side has not yet received 22d bit of data word | gate data word from side B (register DSRB) |
| 48 | redundant mode, B side too far behind A side | A side has received last bit of data word,<br>B side has not yet received 22d bit of data word | gate data word from side A (register DSRA) |
| 416 | abnormal data word reception discon- | B side received first bit of data word after A side received | gate data word from side B (register |

-continued

| Gate No. | Mode or Abnormal Condition Detected | Condition(s) Under Which Output Signal is Generated | Action Instituted |
|---|---|---|---|
| | tinuity by side A | first bit, B side has received last bit of data word, and A side has not received last bit of data word | DSRB) |
| 417 | abnormal data word reception discontinuity by side B | A side received first bit of data word after B side received first bit, B side has not received last bit of data word, and A side has received last bit of data word | gate data word from side A (register DSRA) |

Structure of Differentiators

Figure 7:
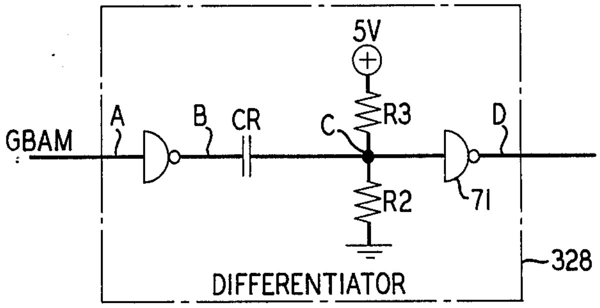
FIG. 7 illustrates the circuitry of a differentiator circuit shown in FIGS. 2 and 3.
Figure 8:
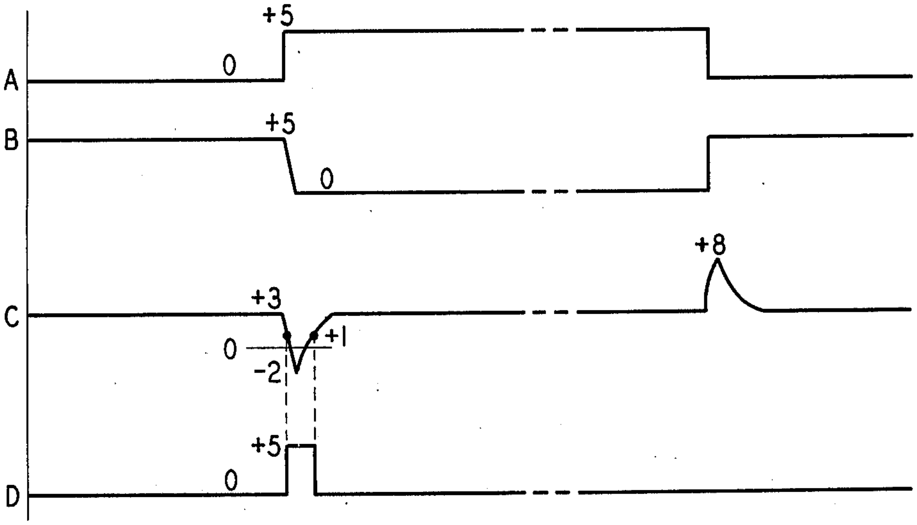
FIG. 8 illustrates various voltage levels which are later utilized to explain the operation of the differentiator shown in FIG. 7.

Turning now to FIGS. 7 and 8, the operation of differentiators 328 and 340 shown in FIGS. 3 and 2 respectively will now be described in detail. Because the operation of both differentiators is substantially identical, only differentiator 328 will be described. FIG. 7 illustrates the component elements of the differentiator and FIG. 8 illustrates the voltage levels within the differentiator at various points in time. Normally lead GBAM in FIG. 4 is LOW and point A in FIG. 7 is at ground potential as shown in FIG. 8. Point B is at positive 5 volts whereas point C is part of a voltage divider network and is approximately positive 3 volts. When lead GBAM goes HIGH to an approximate level of positive 5 volts then point B goes to a gound potential. Point C drops to a voltage level of negative 2, and inverter 71 generates a HIGH level output when its input goes below positive 1 volt. Thus point D goes to positive 5 volts.

As the capacitor CR discharges, level C exponentially resumes its normal state of positive 3 volts. When point C reaches approximately positive 1 volt, then inverter 71 generates a LOW output. At some future time when lead GBAM again resumes a LOW state (normally after 2 $\mu s$ delay induced by delay element 419 in FIG. 4), then initially point C ascends to positive 8 volts. However, the voltage transition at point C is not reflected in the output of point D because gate 71 is already providing a LOW output. Thus, the differentiator in response to a LOW to HIGH voltage change on lead GBAM generates a single HIGH pulse of short duration. This pulse serves to set flip-flop 329, as discussed previously.

Summary

In summary, first and second counters are provided in my illustrative skew compensation arrangement to count the respective number of data bits received over duplicated data links. When one of the ocunters reaches a predetermined count indicating that a complete data word has been received, a determination is made if the present count in the other counter is within an allowable number of counts based upon the expected transit differential in signals conveyed over the data links. If this relationship exists, then the faster side waits for the slower side to receive the complete data word and then comparison is instituted between the words to ensure the integrity of the data. However, if the above relationship does not exist indicating that one link has fallen too far behind the other link, then the complete data word stored in the faster side is immediately gated out and executed.

Facilities are also provided for operating in a unitary mode in which data comparisons are not instituted. Structure is provided for terminating skew compensation when one side detects the presence of the first bit of the next word. Further structure is provided for detecting abnormal discontinuities in data reception by one side of the duplicated data reception arrangement.

Thus whenever possible skewing is overcome and data comparisons are instituted to ensure the integrity of the data words received over duplicated transmission paths; however, when such comparisons would require excessive delays, comparisons are not instituted and the first completely received data word is immediately acted upon.

What is claimed is:

1. In a duplicated transmission system wherein a word comprising a fixed number of bits is transmitted over a first transmission path and stored in first storage means as received over said first path, and is transmitted over a second transmission path and stored in second storage means as received over said second path, a skew compensation arrangement comprising first counting means for indicating the number of bits of said word received over said first path;

second counting means for indicating the number of bits of said word received over said second path;

generating means jointly responsive to the number indicated by said second counting means and to said first counting means indicating a number equal to said fixed number for alternatively 1. generating a first gating signal if the number indicated by said second counting means is less than an allowable number, said allowable number being less than said fixed number, or
2. generating a second gating signal when the number indicated by said second counting means is equal to said fixed number;

first gating means responsive to said first gating signal for gating out the word stored in said first storage means; and second gating means responsive to said second gating signal for gating out the word stored in said first storage means and the word stored in said second storage means.

2. The skew compensation arrangement according to claim 1 further comprising comparing means connected to said second gating means for comparing said word gated out from said first storage means with said word gated out from said second storage means.

3. The skew compensation arrangement according to claim 2 further comprising third gating means including said first gating means and responsive to said comparing means for gating out the word stored in a selected one of said first and second storage means.

4. The skew compensation arrangement according to claim 1 wherein said first counting means comprises a first shift register having a plurality of stages, and means for inserting a specified binary bit into said first shift register and for shifting all the bits in said first shift register each time a bit of the word is received over said first path, and said second counting means comprises a second shift register having a plurality of stages, and means for inserting a specified binary bit into said second shift register and for shifting all the bits in said second shift register each time a bit of the word is received over said second path.

5. The skew compensation arrangement according to claim 4 wherein said generating means comprises first logic means responsive to said specified binary bit in one of said stages of said first shift register for indicating that all the bits of the word have been received over said first path, second logic means responsive to said specified binary bit in one of said stages of said second shift register for indicating that all the bits of the word have been received over said second path, and third logic means responsive to said specified binary bit another one of said stages of said second register for indicating that less than said allowable number of binary bits have been received over said second path.

6. In the system according to claim 1 wherein the transmission delay induced by said first path is different than the transmission delay induced by said second path; said arrangement wherein the difference between said allowable number and said fixed number corresponds to the difference in said transmission delays.

7. In a duplicated transmission system wherein a word comprising a fixed number of bits is transmitted over a first transmission path and stored in first storage means as received over said first path, and is transmitted over a second transmission path and stored in second storage means as received over said second path, a skew compensation arrangement comprising first counting means for counting each of the bits of said word received over said first path;

second counting means for counting each of the bits of said word received over said second path; and logic means jointly responsive to the count of said second counting means and to said first counting means reaching a count equal to said fixed number for alternatively 1. gating out the word stored in said first storage means if the difference between said fixed number and the count reached by said second counting means is greater than a predetermined limit, or
2. comparing the word stored in said first storage means with the word stored in said second storage means after said second counting means reaches said fixed number.

8. In the system according to claim 7 wherein said first and second paths are of different lengths, said arrangement wherein said predetermined limit is based upon (1) the difference in length of said paths (2) the corresponding time for signals to traverse said difference in length, and (3) the frequency at which the bits of said word are transmitted.

9. The skew compensation arrangement according to claim 7 wherein said first counting means comprises a first shift register having a plurality of stages and means for inserting a predetermined binary bit into the first stage of said first shift register and for shifting the contents of said first shift register each time a bit of said word is received over said first path, said second counting means comprises a second shift register having a plurality of stages and means for inserting a predetermined binary bit into the first stage of said second shift register and for shifting the contents of said second shift register each time a bit of said word is received over said second path, and said logic means is responsive to the presence of said predetermined binary bit in selected stages of said first and second shift registers.

10. The skew compensation arrangement according to claim 9 wherein each of said first and second shift registers comprises said fixed number of stages and wherein said logic means is responsive to the presence of said predetermined binary bit in the last stage of said first shift register, in the last stage of said second shift register, and in another stage of said second shift register, said other stage being separated from said last stage by a number of stages corresponding to said predetermined limit.

11. In a duplicated transmission system wherein a word comprising a fixed number of bits is transmitted over a first transmission path and stored in first storage means as received over said first path, and is transmitted over a second transmission path and stored in second storage means as received over said second path, a circuit responsive to abnormal data reception discontinuities comprising first counting means for counting each of the bits of said word received over said first path, first generating means for generating a first last-bit-received signal when the count reached by said first counting means is equal to said fixed number, second counting means for counting each of the bits of said word received over said second path, second generating means for generating a second last-bit-received signal when the count reached by said second counting means is equal to said fixed number, means responsive to said first and second counting means for generating a status signal if the first bit of said word is received over said first path before the first bit of said word is received over said second path, and logic means jointly responsive to said status signal, said second last-bit-received signal, and the absence of said first last-bit-received signal for gating the word from said second storage means.

12. For use in a duplicated transmission system wherein each of a plurality of words is transmitted over a first transmission path and a second transmission path, and wherein each of said words comprises a fixed number of bits, the combination comprising storage means for temporarily storing each of the words received over said first path, first counting means for counting each of the bits of each of the words received over said first path, first generating means for generating a first signal when the count reached by said first counting means is equal to said fixed number, means for detecting the reception of the first bit of a succeeding word received over said first path and for thereupon providing a new-word-received signal, second counting means for counting each of the bits of each of the words received over said second path, second generating means for generating a second signal when the count reached by said second counter means is equal to said fixed number, and means jointly responsive to said first signal, said new-word-received signal and the absence of said second signal for gating out the word stored in said storage means.

13. In a duplicated transmission system wherein a data word comprising X data bits is serially transmitted substantially simultaneously over a first transmission path having a first delay characteristic and over a second transmission path having a second delay characteristic, a skew compensation arrangement comprising a first shift register for storing the word as received over said first path, a second shift register for storing the word as received over said second path, a first shift register counter having X stages for storing a binary bit in each stage, a second shift register counter having X stages for storing a binary bit in each stage, means for inserting a predetermined binary bit into the first stage of said first counter and for shifting each of the bits in each of the stages of said first counter into the succeeding stages of said first counter each time a said data bit of said word is received over said first path, means for inserting a predetermined binary bit into the first stage of said second counter and for shifting each of the bits in each of the stages of said second counter into the succeeding stages of said second counter each time a said data bit of said word is received over said second path, first generating means for generating a first last-bit-received signal when said predetermined binary bit is shifted into the last stage of said first counter, second generating means for generating a second last-bit-received signal when said predetermined binary bit is shifted into the last stage of said second counter, third generating means for generating a control signal if said predetermined binary bit is not in the Nth stage of said second counter where N is an integer less than X, logic means responsive to said first last-bit-received signal for alternatively 1. generating a first gating signal responsive to said control signal, or
2. generating a second gating signal responsive to said second last-bit-received signal, first gating means controlled by said first gating signal for gating said word from said first shift register, and second gating means controlled by said second gating signal for gating the word from said first shift register and the word from said second shift register.

14. In a duplicated transmission system wherein a word comprising a fixed number of bits is transmitted over a first transmission path and stored in first storage means as received over said first path, and is transmitted over a second transmission path and stored in second storage means as received over said second path, a skew compensation arrangement comprising a first counter for counting each of the bits of said word received over said first path, a second counter for counting each of the bits of said word received over said second path, and means jointly responsive to the count of said second counter and to said first counter reaching a count equal to said fixed number for alternatively gating the word out of said first storage means if the count reached by said second counter is within a predetermined number of counts of said fixed number or waiting for said second counter to reach a count equal to said fixed number and then comparing the words in said first and second storage means.

15. In an arrangement for verifying that the same data word is received from independent first and second commmunication paths, the combination comprising first receiving means for storing the bits of the data word as serially received from said first communication path, second receiving means for storing the bits of the data word as serially received from said second communication path, means responsive to both said receiving means for providing a first indication if the overlap in time during the reception of said data words by said first and second receiving means is within a predetermined time interval and for providing a second indication if said overlap is less than said predetermined time interval, comparing means responsive to said first indication for comparing said data word received from said first communication path with said data word received from said second communication path after all bits of said data words have been received from said communication path, and gating means responsive to said second indication for gating said data word from the one of said receiving means which first receives all bits of said data word.

16. The combination according to claim 15 further comprising second gating means including said last-mentioned gating means responsive to said comparing means for gating said data word selectively from either of said receiving means.

17. The combination according to claim 16 wherein said second gating means further includes means responsive to information is said data word for selecting the receiving means from which said data word is gated.

18. For use with a duplicated transmission system wherein a multibit data word is serially transmitted substantially simultaneously over first and second independent transmission paths, the combination comprising first and second data shift registers for storing the data word received over said first and second paths, respectively, first and second shift register counters respectively responsive to the storing of data bits of said data word in said first and second data shift registers, data utilization means for utilizing a data word gated thereto from either of said first and second data shift registers, and logic means jointly responsive to the counts of both said first and second shift register counters for gating the data word to said data utilization means from a selected one of said first and second data shift registers.

* * * * *

UNITED STATES PATENT AND TRADEMARK OFFICE

CERTIFICATE OF CORRECTION

PATENT NO. : 3,927,392

DATED : December 16, 1975

INVENTOR(S) : Lionel Caron

It is certified that error appears in the above-identified patent and that said Letters Patent are hereby corrected as shown below:

Column 6, line 24, "signal" should read --single--. Column 10, line 9, "In" should read --The--; line 36, "contain/s" should read --contains 1s--. Column 14, line 47, cancel "rightmost" and insert --(i.e.,--. Column 17, line 31, "gound" should read --ground--; line 55, "ocunters" should read --counters--. Column 19, claim 5, line 30, after "bit" insert --in--. Column 22, claim 17, line 55, "is" should read --in--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*